United States Patent
Boué et al.

(10) Patent No.: US 12,511,226 B2
(45) Date of Patent: Dec. 30, 2025

(54) TEST CASE PRIORITIZATION

(71) Applicant: Microsoft Technology Licensing, LLC, Redmond, WA (US)

(72) Inventors: Laurent Boué, Petah Tikva (IL); Kiran Rama, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 18/180,484

(22) Filed: Mar. 8, 2023

(65) Prior Publication Data

US 2024/0303185 A1 Sep. 12, 2024

(51) Int. Cl.
| | |
|---|---|
| *G06F 9/44* | (2018.01) |
| *G06F 8/71* | (2018.01) |
| *G06F 11/3668* | (2025.01) |
| *G06N 3/0442* | (2023.01) |
| *G06N 3/08* | (2023.01) |
| *G06Q 10/10* | (2023.01) |

(52) U.S. Cl.
CPC ....... *G06F 11/3688* (2013.01); *G06N 3/0442* (2023.01); *G06N 3/08* (2013.01)

(58) Field of Classification Search
CPC ............. G06F 11/3688; G06F 11/3692; G06F 11/3684; G06N 3/0442; G06N 3/08; G06N 20/00
See application file for complete search history.

(56) References Cited

U.S. PATENT DOCUMENTS

| | | | | |
|---|---|---|---|---|
| 10,073,763 B1 * | 9/2018 | Raman | ................ | G06F 11/3688 |
| 10,311,405 B2 * | 6/2019 | Burton | ................ | G06Q 10/103 |
| 11,526,429 B1 * | 12/2022 | Dutta | ................ | G06F 11/3684 |
| 11,809,841 B1 * | 11/2023 | Zhang | ................ | G06F 8/33 |
| 2018/0129497 A1 * | 5/2018 | Biddle | ................ | G06F 11/3668 |
| 2019/0057014 A1 | 2/2019 | Shalev | | |
| 2021/0263728 A1 * | 8/2021 | Farrier | ................ | G06F 17/18 |

(Continued)

FOREIGN PATENT DOCUMENTS

| | | | |
|---|---|---|---|
| CN | 114116496 A | * | 3/2022 |
| EP | 3508981 A1 | | 7/2019 |

OTHER PUBLICATIONS

PDF English version of Tian et al. (CN 114116496 A), Automatic Test Method, Device, Device And Medium (Year: 2022).*

(Continued)

*Primary Examiner* — S. Sough
*Assistant Examiner* — Mohammad H Kabir
(74) *Attorney, Agent, or Firm* — Holzer Patel Drennan

(57) ABSTRACT

A computing system encodes a next graph based on modified source code files recorded by the next code commit event. The computing system inputs the next graph to a graph machine learning model, the graph machine learning model being trained by graphs representing modified source code files and software test results corresponding to multiple code commit events occurring prior to the next code commit event in the sequence of code commit events. The computing system determines an order of test cases of the next code commit event using the graph machine learning model in an inference mode. The computing system executes the test cases according to the order during the software development build process corresponding to the next code commit event.

20 Claims, 7 Drawing Sheets

(56) References Cited

U.S. PATENT DOCUMENTS

2024/0001942 A1* 1/2024 Mueller .............. B60W 60/001
2024/0289260 A1* 8/2024 Arya ................... G06F 11/3684

OTHER PUBLICATIONS

Pan, et al., "Test Case Selection and Prioritization Using Machine Learning: A Systematic Literature Review", In Repository of arXiv:2106.13891v2, Oct. 5, 2021, 34 Pages.
International Search Report and Written Opinion received for PCT Application No. PCT/US2024/017190, Jun. 27, 2024, 13 pages.
International Preliminary Report On Patentability received for PCT Application No. PCT/US2024/017190, Sep. 18, 2025, 08 pages.

* cited by examiner

TEST CASE PRIORITIZATION

BACKGROUND

The widespread adoption of continuous integration (CI) and test-driven-development (TDD) within the software industry has led to a dramatic increase in the costs associated with software testing. Typically, such development practices advocate running a test suite on the software project frequently, such as after each code change is committed to a code repository. However, as the number of test cases and the number of code commits increase for a given software project, each test iteration imposes a high computational cost and further degrades developer productivity (e.g., as the developer waits for the test suite to pass before their code change is accepted).

A test suite for a software project can include multiple types of test cases including, without limitation, regression test cases and feature test cases. Regression test cases are designed to confirm that previously existing functionality has not been broken by a recent code change. Feature test cases, in contrast, are designed to test new functionality introduced by the recent code change. Typically, the number of regression test cases is very large in comparison to the number of feature test cases, at least in part because the regression test case is accumulated with each new feature coded into the software project.

SUMMARY

In some aspects, the techniques described herein relate to a method of prioritizing test cases to be tested in a software development build process for a next code commit event in a sequence of code commit events, the method including: encoding a next graph based on modified source code files recorded by the next code commit event; inputting the next graph to a graph machine learning model, the graph machine learning model being trained by graphs representing modified source code files and software test results corresponding to multiple code commit events occurring prior to the next code commit event in the sequence of code commit events; and determining an order of test cases of the next code commit event using the graph machine learning model in an inference mode.

In some aspects, the techniques described herein relate to a computing system for prioritizing test cases to be tested in a software development build process for a next code commit event in a sequence of code commit events, the computing system including: one or more hardware processors; a graph encoder executable by the one or more hardware processors and configured to encode a next graph based on modified source code files recorded by the next code commit event, wherein the next graph includes a test case node corresponding to a software test case in next code commit event and the test case node includes historical failure rate of the software test case in the sequence of code commit events; and an inference system executable by the one or more hardware processors and configured to input the next graph to a graph machine learning model, the graph machine learning model being trained by graphs representing modified source code files and software test results corresponding to multiple code commit events occurring prior to the next code commit event in the sequence of code commit events, and to determine an order of test cases of the next code commit event using the graph machine learning model in an inference mode.

In some aspects, the techniques described herein relate to one or more tangible processor-readable storage media embodied with instructions for executing on one or more processors and circuits of a computing device a process of prioritizing test cases to be tested in a software development build process for a next code commit event in a sequence of code commit events, the process including: encoding a next graph based on modified source code files recorded by the next code commit event, wherein the next graph includes a source code node corresponding to a modified source code file in a corresponding code commit event; inputting the next graph to a graph machine learning model, the graph machine learning model being trained by graphs representing modified source code files and software test results corresponding to multiple code commit events occurring prior to the next code commit event in the sequence of code commit events; and determining an order of test cases of the next code commit event using the graph machine learning model in an inference mode.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

The described technology uses machine learning based on a dynamic graph to prioritize the order in which individual test cases are applied to a software project in a test suite. For example, a machine learning model can predict which test cases have a higher likelihood of failure, and these test cases can be prioritized for earlier execution in a given test suite compared to those with a lower likelihood of failure. Accordingly, the test suite can be designed to shorten the total execution time of a failing test suite because the test suite can be terminated when a certain number of test cases fail, so the test suite is more likely to terminate early if the higher-likelihood test cases are executed first. This approach provides a technical benefit of shortening test suite execution time when the test suite includes test cases that fail.

Figure 1:
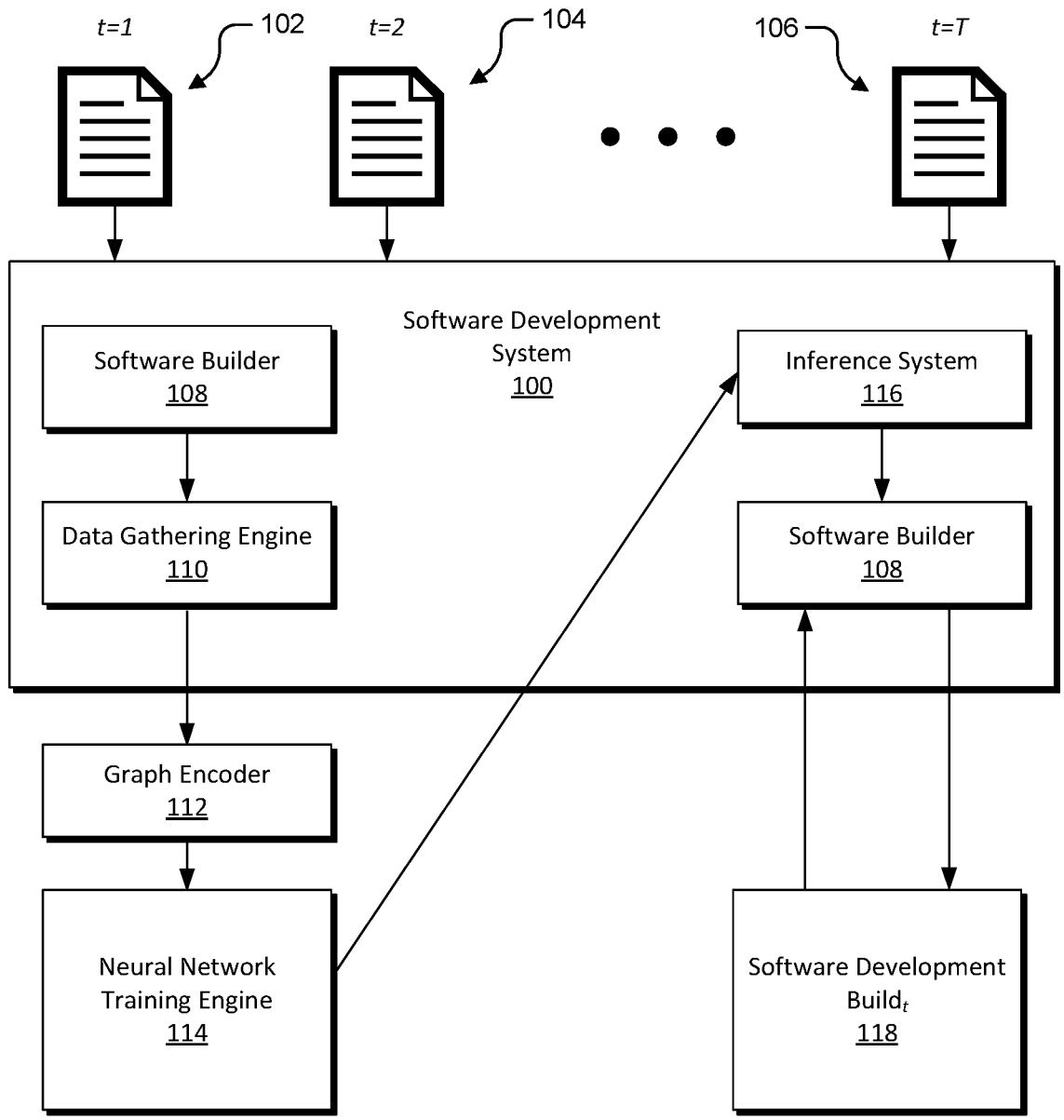
FIG. 1 illustrates an example software development system providing test case prioritization.

FIG. 1 illustrates an example software development system 100 providing test case prioritization. In various implementations, the software development system 100 includes a continuous integration-continuous development system (or a CI/CD system). CI/CD refers to a software development methodology that can provide benefits including, without limitation, faster development, automation, reliability, smaller code changes, and faster release rates. Elements of a CI/CD system may include stages (or combinations thereof), such as version control, build, unit test, deployment to test, auto test, and deployment to production, although other stages may be employed.

Typically, as program code changes are made (e.g., by a programmer) during a development process, the code changes a committed (e.g., submitted, stored, tracked) to a development repository. The program source code is stored in data files, and each data file can contain code of different programming languages. Test cases may also be included in the source code files. A test case includes data and/or program code that can be executed on the executable program code to test for correct functionality. In response to a code commit, a test suite including the test cases is triggered for regression testing, feature testing, and/or other types of testing. The described technology prioritizes the execution order of test cases to tune the test suite in such a way that failures are detected earlier in the testing cycle as compared to a random or untuned test suite.

From the perspective of the software development system 100, the workflow of software development on a software project is event-ordered, where the events correspond to individual code commits to the software development system 100. Typically, each commit event triggers a software build process that converts program source code into an executable software project and runs a test suite on the software project. Each file icon at the top of FIG. 1 (files 102, files 104, and files 106) represents a set of program code files with program data and test cases. The variable t represents a sequential order of code commits for each of the file sets. For example, t=1 indicates a first commit event relating to the files 102, t=2 indicates a second commit event relating to the files 104, and t=T indicates a later commit event relating to the files 106, where T represents the total number of commit events to the codebase (e.g., the number of code commit events in the sequence of code commits for the software project over time). For each commit event t, a set of one or more code files are checked into a code repository accessible by the software development system 100. Each code commit involves a large amount of information, from which meta-information is extracted, such as the meta-information listed below:

List of source code files involved in the code change
Number of lines modified in each source code file, characterizing the size of the delta between the before-commit state of the file and after-commit state of the file A software build process is a workflow for converting program source code files into one or more executable software programs and can include version control, compilation, and/or testing. For example, in some implementations, a programmer checks some program code changes into the software development system 100 (resulting in a code "commit event"). The commit event typically applies a new version to each changed file and increments the version of the software project that includes these files and is built in response to the commit event. The software development system 100 compiles, links, and/or otherwise builds the new version of the software project. Test cases included in the source code files (or obtained from other sources) are executed on the built software project to test previous functionality (e.g., via regression test cases), to test the functionality of new features added with the code commit (e.g., via feature test cases), etc. Identification of the executed test cases and their results are recorded in a build log, typically with additional data.

In FIG. 1, the software development system 100 works in a training mode, focused primarily on the left side of the drawing, and an inference mode, focused primarily on the right side of the drawing. These two processes are described in more detail below, but generally, the training mode trains a graph machine learning model that is used by the inference mode to prioritize the ordering of test cases during the software build process. A graph machine learning model is a class of machine learning models for processing data that is represented in one or more graphs and is typically in the form of one or more graph neural networks (GNNs). In most circumstances, the training mode can be executed once, and a graph-trained test case predictor that includes the trained GNNs can be used for multiple software builds thereafter. In some circumstances, the test case predictor can be retrained to incorporate new software build data so that the test cases can be prioritized for subsequent software builds using updated build data.

In the training mode, a code commit event for t=1 and for files 102 is recorded in the software development system and versioning, compilation, linking, testing, etc., are executed by a software builder 108 to generate a software build (e.g., software build$_1$). It should be understood, however, that, typically, the training mode would include multiple commit events to collect a robust set of training data, so the training mode would generate multiple versions of the software development builds, including results of the test suite executed during these software builds.

For each commit event t, the software builder 108 generates a software build that includes test case results. In the training mode, a data gathering engine 110 gathers relevant training data from the software builds, such as meta-information from the commit event t from the software build$_t$, along with test case identifiers and test results (e.g., on a per-source-code-file basis). The data gathering engine 110 outputs the training data to a graph encoder 112, which encodes the training data into a set of event-ordered graphs G={G(t=1), . . . , G(t=T). Examples of data attributed to nodes and edges in the graph are described below. As a result of this encoding, this set of event-ordered graphs contains training data from the software builds from which it was gathered, including, without limitation:

features of the source code files (e.g., which source code files were changed between two different commit events, how much of each source code file was changed, the programming language of each changed source code file),
features of the test cases (e.g., historical failure rate, number of times the test case has been run in the past),
source code file to test case features (e.g., the number of times a commit of a changed source code file corresponded to a failure of a test case), and
test case to test case features (e.g., the number of times two test cases have co-failed during the same software development build process).

The set of graphs G is used by a neural network training engine 114 to train the GNNs. The set of graphs may also be passed to an inference system 116 for use in the inference mode (e.g., whether from the graph encoder 112 or from another source). After the GNNs have been trained, they are communicated as part of a graph-trained test case predictor (not shown) to the inference system 116 of the software development system 100 for use in prioritizing the order of test cases to be executed during software build processes for future commit events.

In the inference mode, which employs the graph-trained test case predictor, for each new commit event t, an inference system 116 updates the set of graphs with meta-information gathered from the source code files of a new commit event (e.g., using a data gathering engine and a graph encoder). The inference system 116 inputs the updated graph to the graph-trained test case predictor, which scores the likelihood of failure by each of the test cases. Although various treatments for handling these scores may be employed, in at least one implementation, the scores are tested again against a ranking condition to schedule or order the higher scoring (e.g., most likely to fail) test cases earlier in the test suite and the lower scoring test cases later in the test suite. As such, the inference system 116 can tune the order of the test cases in the test suite to increase the likelihood that a test suite will fail earlier in the build process rather than later, thereby tending to reduce the average test time and resource utilization of each software build.

The tuned test suite is input to the software builder 108 (shown in FIG. 1 as a separate box, although typically, the same software builder would be used in both the training mode and the inference mode), and the ordered test cases in the test suite are executed, at least until a designated test failure condition is detected. A test failure condition determines whether the test suite has failed for a given commit event. In some implementations, a test failure condition may be satisfied by the first failure of a test case in the test suite, although other test failure conditions may require failure of a certain number or selection of test cases (e.g., in some systems, failure of some test cases does not necessarily translate to failure of the full test suite).

For each commit event t, the software build process performed by the software development system 100 outputs a software development build 118 corresponding to the commit event t and associated build log records, the latter of which may be stored in a file (e.g., Build_Log.txt). The build log records identify, among other information, the executed test case and the test result (e.g., testStatus). The software development build 118 and the build log records are used to update the set of event-ordered graphs G={G(t=1), . . . , (t=T)} for the software build triggered by the next commit event.

Figure 2:
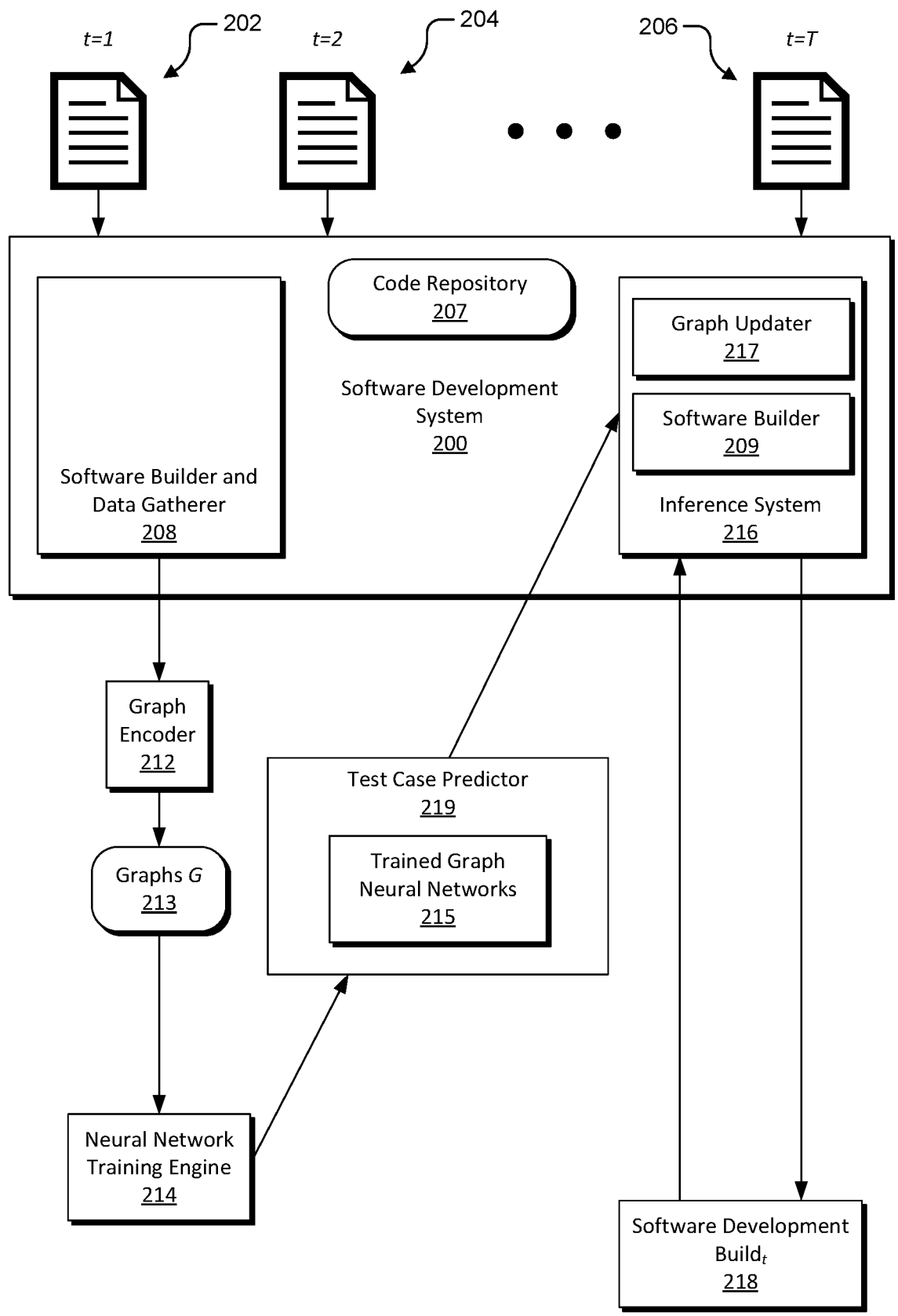
FIG. 2 illustrates more details of an example software development system providing test case prioritization.

FIG. 2 illustrates more details of an example software development system 200 providing test case prioritization. In a training mode, code commit events trigger a software development build process that creates a software build including data that is used to gather training data, which is encoded into a set of graphs to train a test case predictor 219. In an inference mode, each commit event triggers an inference system 216 to tune the order of test cases in a test suite to be executed in the software build process when generating a software build.

From the perspective of the software development system 200, the workflow of software development on a software project is event-ordered, where the events correspond to individual code commits to the software development system 200. Typically, each commit event triggers a software build process that converts program source code into an executable software project and runs a test suite on the software project. Each file icon at the top of FIG. 2 (files 202, files 204, and files 206) represents a set of program code files with program data and test cases. For example, t=1 indicates a first commit event relating to the files 202, t=2 indicates a second commit event relating to the files 204, and t=T indicates a later commit event relating to the files 206, where T represents the total number of commit events to the codebase. For each commit event t, a set of one or more code files are checked into a code repository 207 accessible by the software development system 200.

In FIG. 2, the software development system 200 works in a training mode, focused primarily on the left side of the drawing, and an inference mode, focused primarily on the right side of the drawing. In most circumstances, the training mode can be executed once, and an inference system 216 with the graph-trained test case predictor can be used for multiple software builds thereafter. In some circumstances, the graph-trained test case predictor can be retrained to incorporate new software build data so that the test cases can be prioritized for subsequent software builds using updated build data.

In the training mode, a code commit event for t=1 and for files 202 is recorded in the software development system and versioning, compilation, linking, testing, etc. are executed by a software builder and data gatherer 208 to generate a software build (e.g., software build$_1$). It should be understood, however, that, typically, the training mode would include multiple commit events to collect a robust set of training data, so the training mode would generate multiple versions of the software development builds, including results of the test suite executed during these software builds.

For each commit event t, the software builder and data gatherer 208 generates a software build that includes test case results. In the training mode, the software builder and data gatherer 208 gathers relevant training data from the software builds. The software builder and data gatherer 208 outputs the training data to a graph encoder 212, which encodes the training data into a set of event-ordered graphs G={G(t=1), . . . , G(t=T)} (see graphs 213).

In at least one implementation, each graph is encoded with nodes and edges according to the following, although other graph formats may be employed:

Nodes: The set of nodes present at commit event t is denoted as V (t) and changes with each commit event. For example, if a source code file or test case is removed or added in a commit event, the features associated with the individual nodes, denoted as X_V (t) or X_V_test(t), may also change.

Source Code File Nodes:
- A binary modification indicator—is the file modified in the current commit event?
- The number of lines modified if the previous indicator=1 (file modified); missing value otherwise
- The number of times the file has been modified in past builds (t=1 to T)
- The number of distinct contributors (parties who have executed code commits) to this file has had in the past
- Programming language of the file Test Case Nodes:
- testStatus—a successful test indicator (e.g., 1=pass, 0=fail) based on the current commit event t and software build; typically extracted from the build log as the label vector y_test(t) at commit event t with a vector length equal to the number of test cases present at commit event t; each test case node corresponds to a test case submitted in the commit event t
- A vector embedding of the code fragment of the corresponding test case (e.g., pretrained large language models can be used to represent each test case as a numerical vector)

Historical failure rates and other statistics for the test case, potentially including without limitation the number of assertions in the test case, the number of program code lines in the test case, and the number of times the test case has been executed in the past Programming language of the file Edges: The set of edges present at commit event t is denoted as E(t), and the associated features are denoted as X_E(t) or X_E_test(t). As with the nodes, E (t), X_E(t) or X_E_test(t) may be updated at each commit event.

Source-code-file-to-test-case: This type of edge is created after a commit event that involved a source code file that was associated with the failure of a test case. Once the edge is created in the graph of commit event t, the edge is annotated by a set of features, such as the number of times a commit event involving this source code has resulted in a failure of this test case Test-case-to-test-case: This type of edge is created to link test cases that have commonly failed following the same commit event. The edge encodes the dependencies between the test cases. Once the edge is created in the graph for commit event t, the edge is annotated by a set of features, such as:

The number of times these two tests cases have failed during the same software build The similarity between the code fragments of the test cases, which can be estimated via cosine similarity (or any other vector similarity methods) based on the vector encodings of the two linked test case nodes Adjacency matrix: This matrix is denoted by A (t) and encodes which nodes are connected to other nodes via edges. As both nodes and edges are dynamic and may change with each commit event t, the adjacency matrix itself is also dynamic.

In summary, a graph G(t)={V(t), V_test(t), E(t), A(t), X_V(t), X_V_test(t), X_E(t), y(t)} at commit event t is characterized by its set of nodes V(t) and V_test(t), edges E(t), their respective features X_V(t), X_V_test(t), and X_E(t) and the labels y_test(t) for all test cases. Note that the set of graphs G={G(t=1), . . . , G(t=T)} is event-ordered and building the graph at commit event t=t typically implies an incremental change from the state of the graph at commit event t−1 (e.g., the immediately prior code commit). Procedurally, the training mode may start with an empty graph at event t=0 and then start to populate the set of nodes, edges, their features, and the underlying adjacency matrix based on the historical records from the training build log records.

The set of graphs G is used by a neural network training engine 214 to train the GNN, yielding a test case predictor 219 with trained GNNs 215 that is passed to the inference system 216 of the software development system 200 for use in prioritizing the order of test cases to be executed during software build processes for future commit events. The set of graphs may also be passed to the inference system 216 for use in the inference mode, although the inference system 216 typically generates or at least updates its own set of graphs G after it generates each software development build$_t$ 218.

In the inference mode, which employs the test case predictor 219 with the trained GNNs 215, for each new commit event t, a graph updater 217 updates the set of graphs with meta-information gathered from the files of the commit event (e.g., using a data gathering engine and a graph encoder). The inference system 216 inputs the updated set of graphs to the test case predictor 219, which scores the likelihood of failure by each of the test cases. Although various treatments for handling these scores may be employed, in at least one implementation, the scores are tested against the ranking condition to schedule or order the higher scoring (e.g., most likely to fail) test cases earlier in the test suite and the lower scoring test cases later in the test suite. As such, the inference system 216 can tune the order of the test cases in the test suite to increase the likelihood that a test suite will fail earlier in the build process rather than later, thereby tending to reduce the average test time and resource utilization of each software build.

The tuned test suite is input to a software builder 209, which may or may not be the same software builder used in the training mode, and the ordered test cases in the test suite are executed, at least until a designated test failure condition is detected. A test failure condition determines whether the test suite has failed for a given commit event. In some implementations, a test failure condition may be satisfied by the first failure of a test case in the test suite, although other test failure conditions may require failure of a certain number or selection of test cases (e.g., in some systems, failure of some test cases does not necessarily translate to failure of the full test suite).

For each commit event t, the software build process performed by the software development system 200 outputs a software development build$_t$ 218 corresponding to the commit event t and associated build log records, the latter of which may be stored in a file (e.g., Build_Log.txt). The build log records identify, among other information, the executed test case and the test result (e.g., testStatus). The software development build$_t$ 218 and the build log records are fed back to the inference system 216 and used to update the set of event-ordered graphs G={G(t=1), . . . , G(t=T)} for the software development build triggered by the next commit event.

In one implementation, the build log is formatted with the following schema, although another schema may be employed:

commitID, fileChanged, sizeOfDiff, testName, testStatus where commitID identifies the commit event, fileChanged identifies a code file in the code repository that was modified from its before-commit state to its after-commit state, sizeOfDiff indicates the size of the modification made to the code file (e.g., the number of modified lines in the code file), testName identifies a test case executed on the filedChanged, and testStatus identifies whether the test succeeded or failed on the fileChanged.

As previously described, the build log records are used to construct a set of T event-ordered graphs G={G(t=1)·G(t=2), . . . , G(t=T)}. A graph is defined by nodes corresponding to source code files and test cases, edges corresponding to source-code-file-to-test-case relationships and test-case-to-test-case relationships, and a connectivity structure (e.g., encoded as a time-dependent adjacency matrix). Elements of an example graph are described below, although other graph configurations may be employed.

At any given commit event t, the graph G(t) conforms to a well-defined machine learning setting, where the node/edge features are used as the input features, and the test labels are used as the targets. The architecture of the deep learning model is that of a graph neural network (GNN), where each feature set is associated with a differentiable model (a fully connected layer, for example) and training is carried out by message passing. Each node/edge in the graph gathers all the neighboring node/edge embeddings (messages), aggregates them via an aggregate function (like sum or avg), and passes the embedding through the differentiable model. In the dynamic case, a dynamic graph is generated and employed, instead of a static graph. As such, in some implementations, the graph neural network is configured to work in a dynamic setting, such as by:

Turning the dynamic graph into a static one by creating new edges across time between the nodes, or Training individual GNNs to each one of the graphs before feeding the nodes and edges into sequence-based models, such as LSTMs or attention models.

In both cases listed above, the loss function is defined as the sum of the cross-entropy loss for all events in the training data and for all test cases. Other techniques may also be employed.

Once the dynamic GNN has been trained, it is used in inference mode to predict the probability of failure for all test cases whenever there is a new code commit event. At inference time, there is only a single graph on which the dynamic GNN is applied, but the features of nodes, edges, and the adjacency matrix have been built incrementally from the data gathered from previous commit events and updated with the most recent commit event. The output of the dynamic GNN inference operation includes the test cases and their corresponding probability of failure, which can then be ranked according to their failure probability from highest to lowest. In one implementation, the test cases are ordered in the test suite so that test cases that are most likely to fail following a specific new commit are to be run earlier in the test suite than those test cases that are less likely to fail. In other implementations, additional information may be considered when ordering the test cases.

Figure 3:
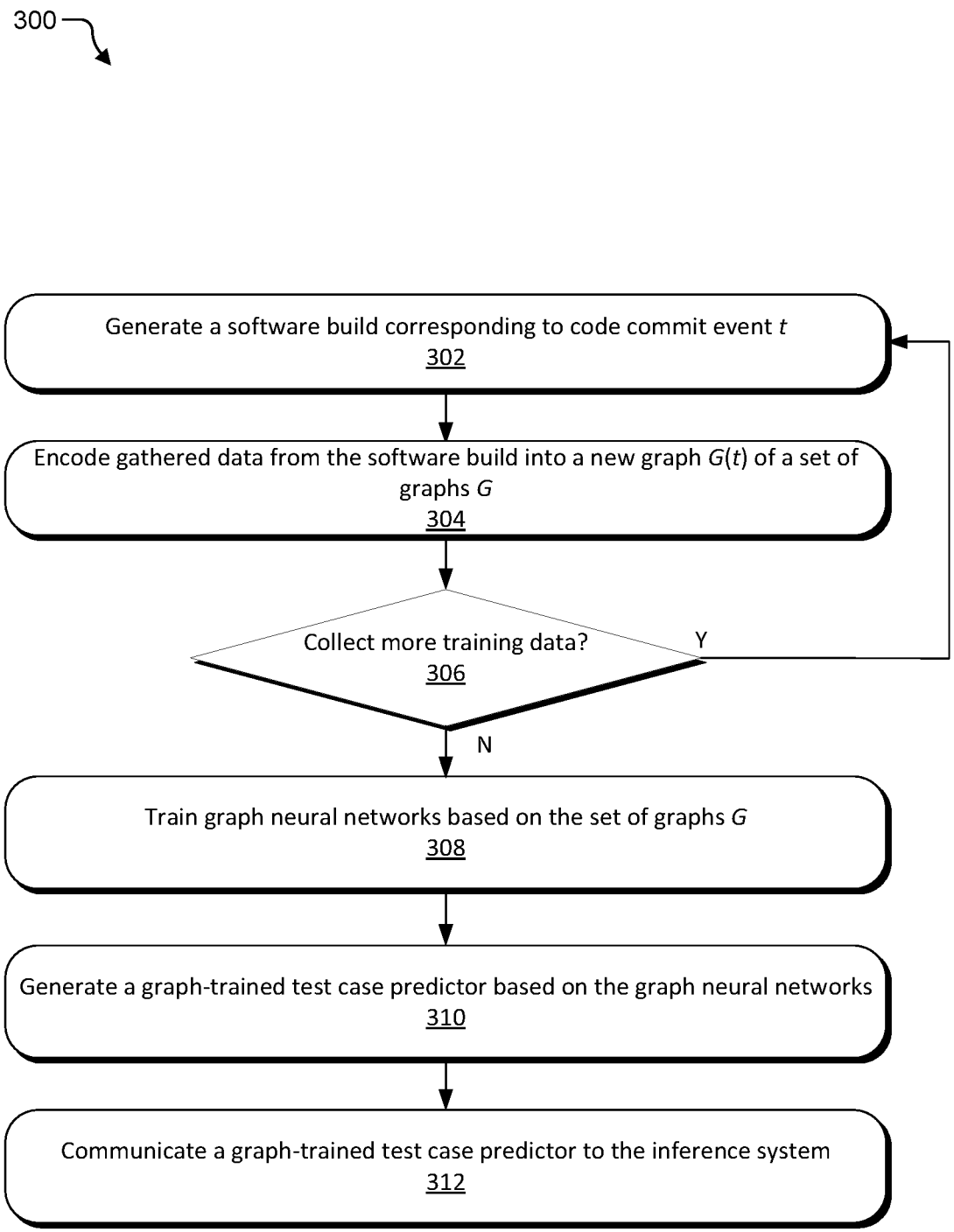
FIG. 3 illustrates example operations for training a graph-trained test case predictor for test case prioritization for a software development system.

FIG. 3 illustrates example operations 300 for training a graph-trained test case predictor for test case prioritization for a software development system. A software build operation 302 generates a software build corresponding to a code commit event t. The output of the software build operation 302 includes a build log recording information about the source code files and test cases of the code commit event t, which can include the identities of modified source code files, test case identifiers, test case results, and other information about the source code files and test cases across a sequence of code commit events (see a decision operation 306 and its iterative effect).

An encoding operation 304 gathers the information output from the software build operation 302 and encodes the gathered data into a graph G(t), which is added to a set of event-ordered graphs G. A decision operation 306 determines whether additional training data is to be collected. If so, processing returns to the software build operation 302 for the next code commit event in the sequence of code commit events. This iterative flow accumulates a robust set of training data for training a graph machine learning model. If the decision operation 306 determines that additional training is not to be performed, processing proceeds to a training operation 308. The training operation 308 trains one or more graph machine learning models (e.g., graph neural networks) on the set of graphs G. An accumulator operation 310 generates a graph-trained test case predictor based on the graph neural network (see FIG. 4). A communication operation 312 communicates the graph-trained test case predictor to an inference engine associated with the software development system.

It should be understood that the set of graphs G accumulates new graphs for each code commit event in a sequence of code commit events. Accordingly, in various implementations, the graph machine learning mode is trained based on modified source code files and test case results from a sequence of code commit events. The sequential nature of the source code modifications and test case results is thereby incorporated into the training of the graph machine learning model as well as the software development build process in inference mode.

Figure 4:
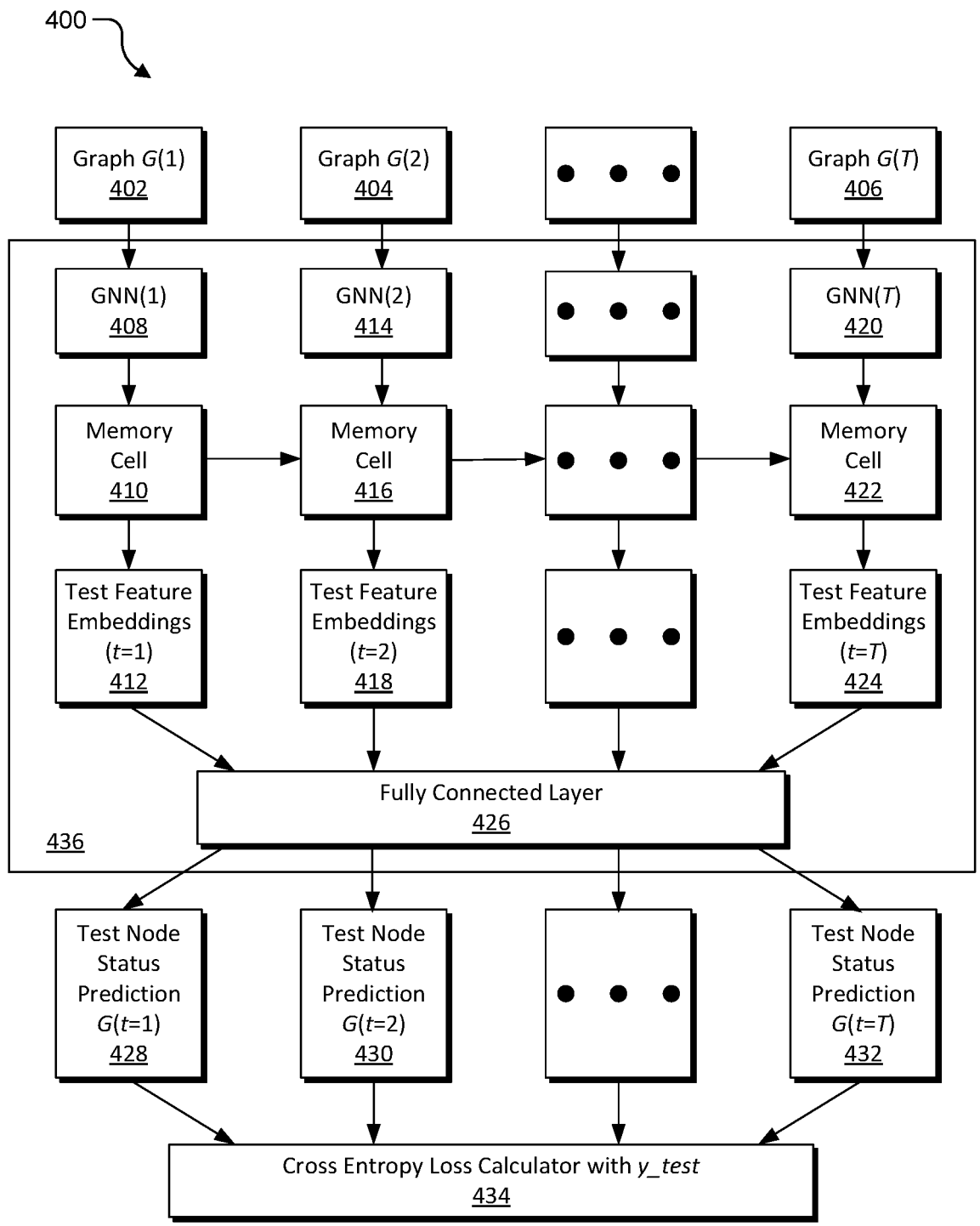
FIG. 4 illustrates example detailed elements of a system for training a graph-trained test case predictor for test case prioritization.

FIG. 4 illustrates example detailed elements of a system 400 for training a graph-trained test case predictor for test case prioritization. The top row of elements in FIG. 4 depicts a set of event-ordered graphs G={G(t=1)·G(t=2), . . . , G(t=T)}, where t represents an event index for an individual code commit event and T represents the total number of code commit events to the codebase (e.g., the number of code commit events in the sequence of code commits for the software project over time). Accordingly, graph G(1) 402 is generated by a graph encoder based on information gathered from a software build resulting from a code commit event of t=1, graph G(2) 404 is generated by a graph encoder based on information gathered from a software build resulting from a code commit event of t=2, graph G(T) 406 is generated by a graph encoder based on information gathered from a software build resulting from a code commit event of t=T, and other graphs may be generated similarly between t=2 and t=T. The event index t and the number of code commit events T will both be incremented for the "next" code commit. The graph encoder encodes each graph in a manner similar to that described with regard to FIG. 2 and other figures herein.

In a training mode, as described with regard to FIGS. 2 and 4, the graph G(1) 402, which includes source file modification information, test case results, etc. for the commit event t=1, is used to train a graph machine learning model (e.g., the trained GNN(1) 408). In FIG. 1, the trained GNN(1) 408 is stored in a memory cell 410, such as a long short-term memory (LSTM), another recurrent neural network, or other types of memory. The memory cell 410 is capable of learning order dependence in sequential prediction problems. For example, recurrent neural networks have an internal state that can represent context information, such as a sequence of inputs. In the described technology, the sequence of inputs includes without limitation source code file information, test cases, and test results for a sequence of code commit events. Accordingly, the content of the memory cell 410 is propagated to a memory cell subsequent commit events to maintain the order dependence in sequential predictions of the likelihood that individual test cases will fail for each code commit event. The GNN(2) 414 and memory cell 416 correspond to commit event 2, and the GNN(T) 420 and memory cell 422 correspond to commit event T, with intermediate elements for commit events between t=2 and t=T.

The GNNs and the memory cells operate as an embedding system to generate embeddings of test features for each commit event. Accordingly, for each commit event t=1, each memory cell outputs a set of test feature embeddings (e.g., test feature embeddings 412 for t=1, test feature embeddings 418 for t=2, test feature embeddings 424 for t=T, and other intermediate embeddings between t=2 and t=T), which are accumulated in a fully connected layer 426. Fully connected layers in neural networks refer to layers in which each neuron applies a transformation to the input vector through a weights matrix. As a result, every input of the input vector influences every output of the output vector.

As shown in FIG. 1, a graph-trained test case predictor 436 is a product of the set of GNNs trained by the set of corresponding graphs from each commit event. As part of the training, the graph-trained test case predictor 436 accumulates the test feature embeddings into the fully connected layer. As such, the graph-trained test case predictor 436 predicts test node status for the individual test cases of commit event, yielding set of test feature prediction graphs (e.g., test feature prediction graphs 428 for t=1, test feature prediction graphs 430 for t=2, test feature prediction graphs 432 for t=T, and other intermediate test feature prediction graphs between t=2 and t=T).

The test feature prediction graphs are input to a cross entropy loss calculator for comparison with the observed test results (e.g., testStatus) obtained from the build logs for each of the commit events. The computed losses are back-propagated during the training mode of the graph-trained test case predictor 434 to adjust the internal parameters of the GNNs during the training mode. The computed losses are also evaluated to determine when to terminate the training mode (e.g., when the losses satisfy a satisfactory training mode condition). The graph-trained test case predictor 436 is then communicated to an inference system for use in scoring and ordering test cases in a test suite for subsequent commit events.

Figure 5:
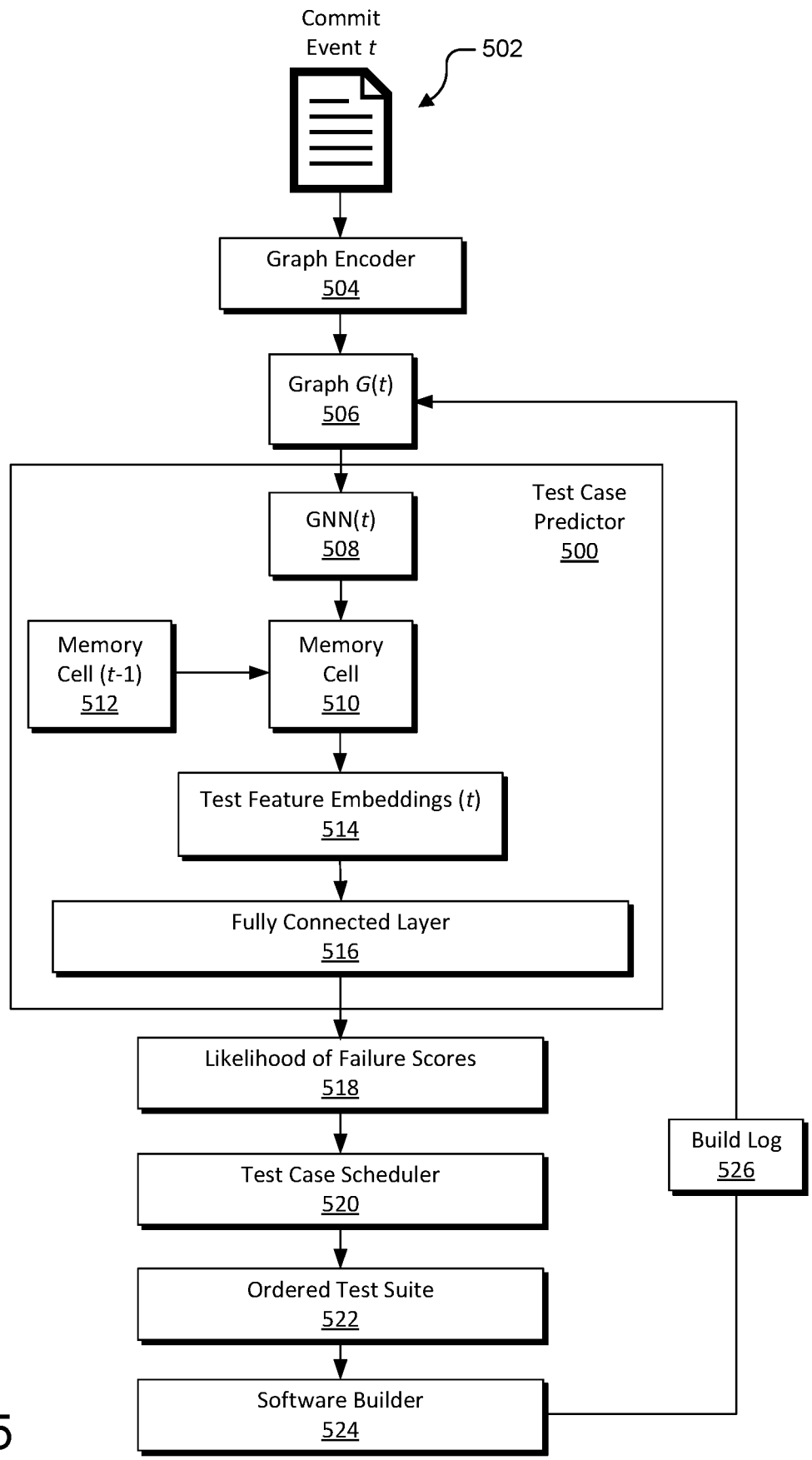
FIG. 5 illustrates example elements of a test case predictor scoring test cases in a test suite using a graph neural network in inference mode.

FIG. 5 illustrates example elements of a test case predictor 500 scoring test cases in a test suite using a graph neural network in inference mode. The elements related to a new commit event t, represented by the file icon 502. A graph encoder 504 receives information regarding the commit event t, such as identities of modified source code files, etc. and encodes this information into a graph 506 (G(t)), which is input to a GNN 508 of the test case predictor 500 in an inference mode.

The GNN 508 is stored in a memory cell 510, such as a long short-term memory (LSTM), another recurrent neural network, or other types of memory, which also receives the propagation of GNNs from the memory cells 512, for the commit event t−1. The GNN and the memory cell operate as an embedding system to generate embeddings of test features for the commit event. Accordingly, the memory cell outputs a set of test feature embeddings (e.g., test feature embeddings 514 for commit event t), which are accumulated in a fully connected layer 516.

The test case predictor 500 outputs likelihood of failure scores 518 of each test case in the commit event t. Based on a ranking condition (e.g., test cases with a higher likelihood of failure are scheduled earlier than test cases with a lower likelihood of failure), a test case scheduler 520 orders the test cases in the test suite to yield an ordered test suite 522. A software builder 524 executes the test cases in the designated order and outputs a build log 526, which is fed back to update the graph 506 with the test results.

Figure 6:
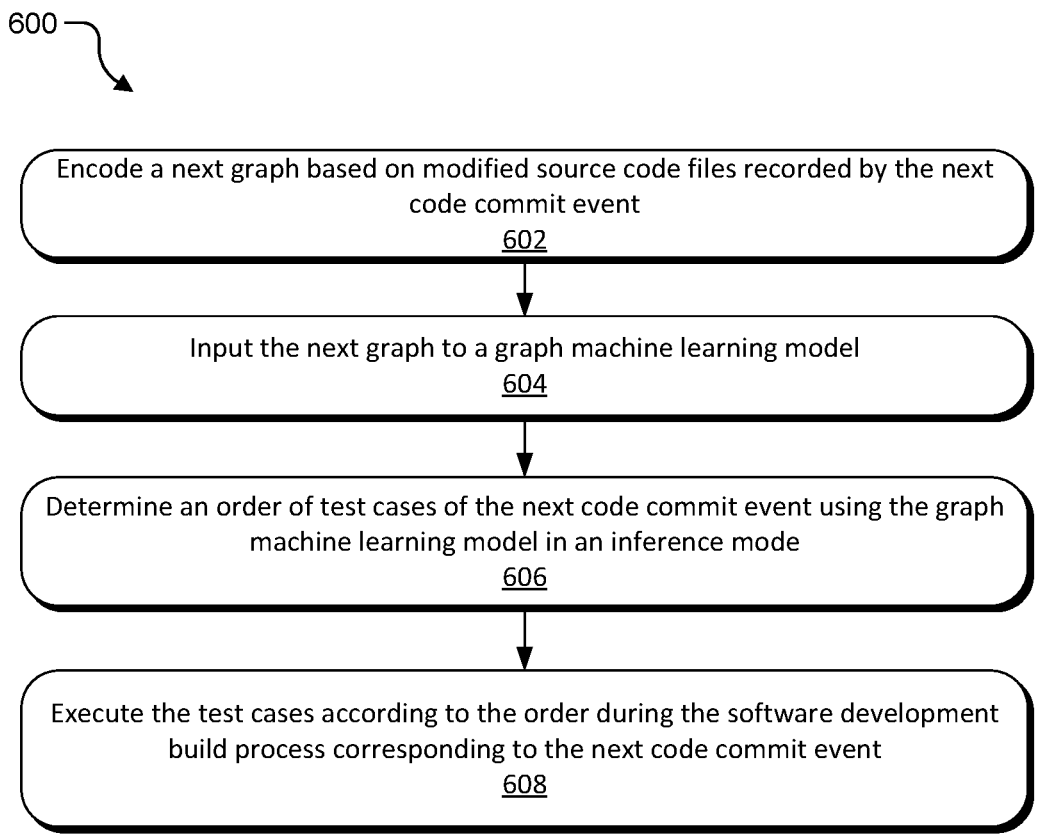
FIG. 6 illustrates example operations for prioritizing test cases using a graph neural network.

FIG. 6 illustrates example operations 600 for prioritizing test cases using a graph neural network. An encoding operation 602 encodes a next graph based on modified source code files recorded by a next code commit event. An inputting operation 604 inputs the next graph to a graph machine learning model that has been trained by graphs representing modified source code files and software test results corresponding to multiple code commit events occurring prior to the next code commit event in the sequence of code commit events.

An inference operation 606 determines an order of test cases of the next code commit event using the trained graph machine learning model. A building operation 608 executes the test cases according to the order during a software development build process corresponding to the next code commit event.

Figure 7:
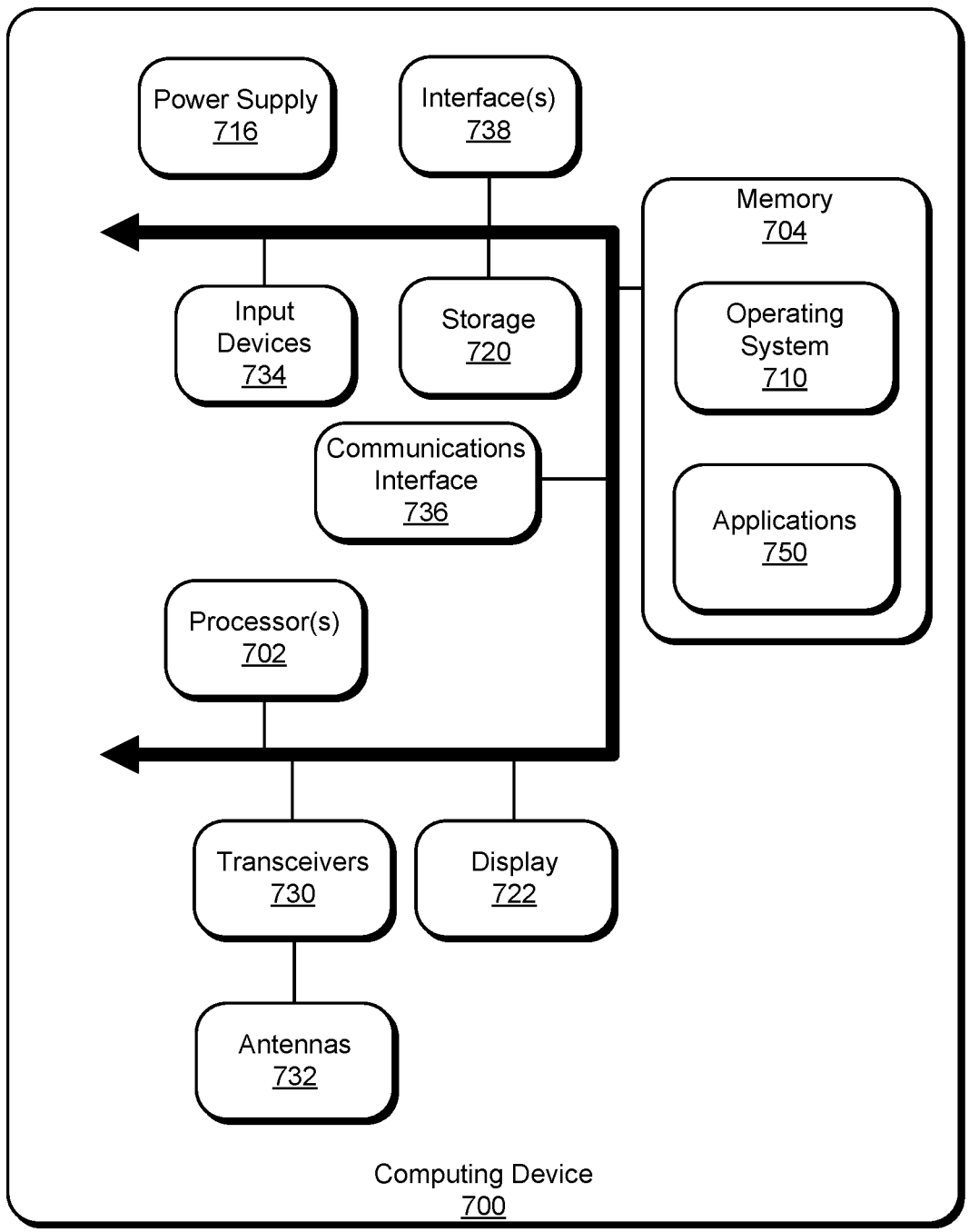
FIG. 7 illustrates an example computing device for use in implementing the described technology.

FIG. 7 illustrates an example computing device 700 for use in implementing the described technology. The computing device 700 may be a client computing device (such as a laptop computer, a desktop computer, or a tablet computer), a server/cloud computing device, an Internet-of-Things (IoT), any other type of computing device, or a combination of these options. The computing device 700 includes one or more processor(s) 702 and a memory 704. The memory 704 generally includes both volatile memory (e.g., RAM) and nonvolatile memory (e.g., flash memory), although one or the other type of memory may be omitted. An operating system 710 resides in the memory 704 and is executed by the processor(s) 702. In some implementations, the computing device 700 includes and/or is communicatively coupled to storage 720.

In the example computing device 700, as shown in FIG. 7, one or more modules or segments, such as applications 750, a software builder, a software development system, a data gathering engine, an inference system, a graph encoder, a neural network training engine, a graph updater, and other program code and modules are loaded into the operating system 710 on the memory 704 and/or the storage 720 and executed by the processor(s) 702. The storage 720 may store source code files, test case code fragments, test results, graphs, and other data and be local to the computing device 700 or may be remote and communicatively connected to the computing device 700. In particular, in one implementation, components of a system for prioritizing test cases to be tested in a software development build process for a next code commit event in a sequence of code commit events may be implemented entirely in hardware or in a combination of hardware circuitry and software.

The computing device 700 includes a power supply 716, which may include or be connected to one or more batteries or other power sources, and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers, client devices, IoT devices, and other computing and communications devices. The computing device 700 may further include a communications interface 736 (such as a network adapter or an I/O port, which are types of communication devices). The computing device 700 may use the adapter and any other types of communication devices for establishing connections over a wide-area network (WAN) or local-area network (LAN). It should be appreciated that the network connections shown are exemplary and that other communications devices and means for establishing a communications link between the computing device 700 and other devices may be used.

The computing device 700 may include one or more input devices 734 such that a user may enter commands and information (e.g., a keyboard, trackpad, or mouse). These and other input devices may be coupled to the server by one or more interfaces 738, such as a serial port interface, parallel port, or universal serial bus (USB). The computing device 700 may further include a display 722, such as a touchscreen display.

The computing device 700 may include a variety of tangible processor-readable storage media and intangible processor-readable communication signals. Tangible processor-readable storage can be embodied by any available media that can be accessed by the computing device 700 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of prioritizing test cases to be tested in a software development build process for a next code commit event in a sequence of code commit events, the method comprising: encoding a next graph based on modified source code files recorded by the next code commit event; inputting the next graph to a graph machine learning model, the graph machine learning model being trained by graphs representing modified source code files and software test results corresponding to multiple code commit events occurring prior to the next code commit event in the sequence of code commit events; and determining an order of test cases of the next code commit event using the graph machine learning model in an inference mode.

Clause 2. The method of clause 1, wherein each graph includes a source code node corresponding to a modified source code file in a corresponding code commit event.

Clause 3. The method of clause 2, wherein the source code node includes a number of lines modified in the modified source code file compared to an immediately prior code commit event in the sequence of code commit events.

Clause 4. The method of clause 2, wherein the source code node includes a number of times the modified source code file had been previously modified in the sequence of code commit events.

Clause 5. The method of clause 1, wherein each graph includes a test case node corresponding to a software test case in a corresponding code commit event and the test case node includes a historical failure rate of the software test case in the sequence of code commit events.

Clause 6. The method of clause 1, wherein each graph includes a source-code-to-test-case edge linking a source code node representing a modified source code file in a corresponding code commit event to a test case node representing a test case in the corresponding code commit event, the source-code-to-test-case edge representing a number of times the modified source code file resulted in failure of the test case.

Clause 7. The method of clause 1, wherein each graph includes a test-case-to-test-case edge linking a node for a first test case to a node for a second test case, the test-case-to-test-case edge representing a number of times the first test case and the second test case failed for a same code commit event.

Clause 8. The method of clause 1, further comprising: executing the test cases according to the order during the software development build process corresponding to the next code commit event.

Clause 9. A computing system for prioritizing test cases to be tested in a software development build process for a next code commit event in a sequence of code commit events, the computing system comprising: one or more hardware processors; a graph encoder executable by the one or more hardware processors and configured to encode a next graph based on modified source code files recorded by the next code commit event, wherein the next graph includes a test case node corresponding to a software test case in next code commit event and the test case node includes historical failure rate of the software test case in the sequence of code commit events; and an inference system executable by the one or more hardware processors and configured to input the next graph to a graph machine learning model, the graph machine learning model being trained by graphs representing modified source code files and software test results corresponding to multiple code commit events occurring prior to the next code commit event in the sequence of code commit events, and to determine an order of test cases of the next code commit event using the graph machine learning model in an inference mode.

Clause 10. The computing system of clause 9, wherein each graph includes a source code node corresponding to a modified source code file in a corresponding code commit event.

Clause 11. The computing system of clause 10, wherein the source code node includes a number of lines modified in the modified source code file compared to an immediately prior code commit event in the sequence of code commit events.

Clause 12. The computing system of clause 10, wherein the source code node includes a number of times the modified source code file had been previously modified in the sequence of code commit events.

Clause 13. The computing system of clause 9, wherein each graph includes a source-code-to-test-case edge linking a source code node representing a modified source code file in a corresponding code commit event to a test case node representing a test case in the corresponding code commit event, the source-code-to-test-case edge representing a number of times the modified source code file resulted in failure of the test case.

Clause 14. The computing system of clause 9, wherein each graph includes a test-case-to-test-case edge linking a node for a first test case to a node for a second test case, the test-case-to-test-case edge representing a number of times the first test case and the second test case failed for a same code commit event.

Clause 15. One or more tangible processor-readable storage media embodied with instructions for executing on one or more processors and circuits of a computing device a process of prioritizing test cases to be tested in a software development build process for a next code commit event in a sequence of code commit events, the process comprising: encoding a next graph based on modified source code files recorded by the next code commit event, wherein the next graph includes a source code node corresponding to a modified source code file in a corresponding code commit event; inputting the next graph to a graph machine learning model, the graph machine learning model being trained by graphs representing modified source code files and software test results corresponding to multiple code commit events occurring prior to the next code commit event in the sequence of code commit events; and determining an order of test cases of the next code commit event using the graph machine learning model in an inference mode.

Clause 16. The one or more tangible processor-readable storage media of clause 15, wherein the source code node includes a number of lines modified in the modified source code file compared to an immediately prior code commit event in the sequence of code commit events.

Clause 17. The one or more tangible processor-readable storage media of clause 15, wherein the source code node includes a number of times the modified source code file had been previously modified in the sequence of code commit events.

Clause 18. The one or more tangible processor-readable storage media of clause 15, wherein each graph includes a test case node corresponding to a software test case in a corresponding code commit event and the test case node includes a historical failure rate of the software test case in the sequence of code commit events.

Clause 19. The one or more tangible processor-readable storage media of clause 15, wherein each graph includes a source-code-to-test-case edge linking a source code node representing a modified source code file in a corresponding code commit event to a test case node representing a test case in the corresponding code commit event, the source-code-to-test-case edge representing a number of times the modified source code file resulted in failure of the test case.

Clause 20. The one or more tangible processor-readable storage media of clause 15, wherein each graph includes a test-case-to-test-case edge linking a node for a first test case to a node for a second test case, the test-case-to-test-case edge representing a number of times the first test case and the second test case failed for a same code commit event.

Clause 21. A system for prioritizing test cases to be tested in a software development build process for a next code commit event in a sequence of code commit events, the method comprising: means for encoding a next graph based on modified source code files recorded by the next code commit event; means for inputting the next graph to a graph machine learning model, the graph machine learning model being trained by graphs representing modified source code files and software test results corresponding to multiple code commit events occurring prior to the next code commit event in the sequence of code commit events; and means for determining an order of test cases of the next code commit event using the graph machine learning model in an inference mode.

Clause 22. The system of clause 21, wherein each graph includes a source code node corresponding to a modified source code file in a corresponding code commit event.

Clause 23. The system of clause 21, wherein the source code node includes a number of lines modified in the modified source code file compared to an immediately prior code commit event in the sequence of code commit events.

Clause 24. The system of clause 23, wherein the source code node includes a number of times the modified source code file had been previously modified in the sequence of code commit events.

Clause 25. The system of clause 21, wherein each graph includes a test case node corresponding to a software test case in a corresponding code commit event and the test case node includes a historical failure rate of the software test case in the sequence of code commit events.

Clause 26. The system of clause 21, wherein each graph includes a source-code-to-test-case edge linking a source code node representing a modified source code file in a corresponding code commit event to a test case node representing a test case in the corresponding code commit event, the source-code-to-test-case edge representing a number of times the modified source code file resulted in failure of the test case.

Clause 27. The system of clause 21, wherein each graph includes a test-case-to-test-case edge linking a node for a first test case to a node for a second test case, the test-case-to-test-case edge representing a number of times the first test case and the second test case failed for a same code commit event.

Clause 28. The system of clause 21, further comprising: means for executing the test cases according to the order during the software development build process corresponding to the next code commit event.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of prioritizing test cases to be tested in a software development build process for a next code commit event in a sequence of code commit events, the method comprising:

encoding a next graph based on modified source code files recorded by the next code commit event;

inputting the next graph to a graph machine learning model, the graph machine learning model being trained by commit-event-ordered training graphs representing modified source code files and software test results corresponding to multiple code commit events occurring prior to the next code commit event in the sequence of code commit events; and determining an order of test cases of the next code commit event using the graph machine learning model in an inference mode.

2. The method of claim 1, wherein each commit-event-ordered training graph includes a source code node corresponding to a modified source code file in a corresponding code commit event.

3. The method of claim 2, wherein the source code node includes a number of lines modified in the modified source code file compared to an immediately prior code commit event in the sequence of code commit events.

4. The method of claim 2, wherein the source code node includes a number of times the modified source code file had been previously modified in the sequence of code commit events.

5. The method of claim 1, wherein each commit-event-ordered training graph includes a test case node corresponding to a software test case in a corresponding code commit event and the test case node includes a historical failure rate of the software test case in the sequence of code commit events.

6. The method of claim 1, wherein each commit-event-ordered training graph includes a source-code-to-test-case edge linking a source code node representing a modified source code file in a corresponding code commit event to a test case node representing a test case in the corresponding code commit event, the source-code-to-test-case edge representing a number of times the modified source code file resulted in failure of the test case.

7. The method of claim 1, wherein each commit-event-ordered training graph includes a test-case-to-test-case edge linking a node for a first test case to a node for a second test case, the test-case-to-test-case edge representing a number of times the first test case and the second test case failed for a same code commit event.

8. The method of claim 1, further comprising:
executing the test cases according to the order during the software development build process corresponding to the next code commit event.

9. A computing system for prioritizing test cases to be tested in a software development build process for a next code commit event in a sequence of code commit events, the computing system comprising:
one or more hardware processors;
a graph encoder executable by the one or more hardware processors and configured to encode a next graph based on modified source code files recorded by the next code commit event, wherein the next graph includes a test case node corresponding to a software test case in next code commit event and the test case node includes historical failure rate of the software test case in the sequence of code commit events; and
an inference system executable by the one or more hardware processors and configured to input the next graph to a graph machine learning model, the graph machine learning model being trained by commit-event-ordered training graphs representing modified source code files and software test results corresponding to multiple code commit events occurring prior to the next code commit event in the sequence of code commit events, and to determine an order of test cases of the next code commit event using the graph machine learning model in an inference mode.

10. The computing system of claim 9, wherein each commit-event-ordered training graph includes a source code node corresponding to a modified source code file in a corresponding code commit event.

11. The computing system of claim 10, wherein the source code node includes a number of lines modified in the modified source code file compared to an immediately prior code commit event in the sequence of code commit events.

12. The computing system of claim 10, wherein the source code node includes a number of times the modified source code file had been previously modified in the sequence of code commit events.

13. The computing system of claim 9, wherein each commit-event-ordered training graph includes a source-code-to-test-case edge linking a source code node representing a modified source code file in a corresponding code commit event to a test case node representing a test case in the corresponding code commit event, the source-code-to-test-case edge representing a number of times the modified source code file resulted in failure of the test case.

14. The computing system of claim 9, wherein each commit-event-ordered training graph includes a test-case-to-test-case edge linking a node for a first test case to a node for a second test case, the test-case-to-test-case edge representing a number of times the first test case and the second test case failed for a same code commit event.

15. One or more tangible processor-readable storage media embodied with instructions for executing on one or more processors and circuits of a computing device a process of prioritizing test cases to be tested in a software development build process for a next code commit event in a sequence of code commit events, the process comprising:
encoding a next graph based on modified source code files recorded by the next code commit event, wherein the next graph includes a source code node corresponding to a modified source code file in a corresponding code commit event;

inputting the next graph to a graph machine learning model, the graph machine learning model being trained by commit-event-ordered training graphs representing modified source code files and software test results corresponding to multiple code commit events occurring prior to the next code commit event in the sequence of code commit events; and determining an order of test cases of the next code commit event using the graph machine learning model in an inference mode.

16. The one or more tangible processor-readable storage media of claim 15, wherein the source code node includes a number of lines modified in the modified source code file compared to an immediately prior code commit event in the sequence of code commit events.

17. The one or more tangible processor-readable storage media of claim 15, wherein the source code node includes a number of times the modified source code file had been previously modified in the sequence of code commit events.

18. The one or more tangible processor-readable storage media of claim 15, wherein each commit-event-ordered training graph includes a test case node corresponding to a software test case in a corresponding code commit event and the test case node includes a historical failure rate of the software test case in the sequence of code commit events.

19. The one or more tangible processor-readable storage media of claim 15, wherein each commit-event-ordered training graph includes a source-code-to-test-case edge linking a source code node representing a modified source code file in a corresponding code commit event to a test case node representing a test case in the corresponding code commit event, the source-code-to-test-case edge representing a number of times the modified source code file resulted in failure of the test case.

20. The one or more tangible processor-readable storage media of claim 15, wherein each commit-event-ordered training graph includes a test-case-to-test-case edge linking a node for a first test case to a node for a second test case, the test-case-to-test-case edge representing a number of times the first test case and the second test case failed for a same code commit event.

* * * * *